(12) United States Patent
Neurauter et al.

(10) Patent No.: US 10,454,748 B2
(45) Date of Patent: Oct. 22, 2019

(54) APPARATUS AND A METHOD FOR GENERATING A RADIO FREQUENCY SIGNAL

(71) Applicant: Intel IP Corporation, Santa Clara, CA (US)

(72) Inventors: Burkhard Neurauter, Linz (AT); Christian Mayer, Wilhering (AT); Jan Zaleski, Linz (AT); Jovan Markovic, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/754,043

(22) PCT Filed: Sep. 25, 2015

(86) PCT No.: PCT/IB2015/057377
§ 371 (c)(1),
(2) Date: Feb. 21, 2018

(87) PCT Pub. No.: WO2017/051218
PCT Pub. Date: Mar. 30, 2017

(65) Prior Publication Data
US 2018/0248740 A1 Aug. 30, 2018

(51) Int. Cl.
*H04L 27/36* (2006.01)
*H04L 27/34* (2006.01)

(52) U.S. Cl.
CPC ........ *H04L 27/362* (2013.01); *H04L 27/3444* (2013.01)

(58) Field of Classification Search
CPC .... H04L 27/3444; H04L 27/362; H03M 1/66; H03C 3/40; H03C 2200/0058
See application file for complete search history.

(56) References Cited

U.S. PATENT DOCUMENTS 5,825,820 A * 10/1998 Urabe .................. H03G 3/3047
 375/259
2004/0005017 A1* 1/2004 Borowski ........... H04L 27/0014
 375/329

(Continued)

FOREIGN PATENT DOCUMENTS

EP 0283725 A2 9/1988
EP 0631398 A2 12/1994

*Primary Examiner* — Syed Haider
(74) *Attorney, Agent, or Firm* — 2SPL Patent Attorneys PartG mbB; Kieran O'Leary

(57) ABSTRACT

An apparatus for generating a radio frequency signal based on a symbol within a constellation diagram is provided. The constellation diagram is spanned by a first axis representing an in-phase component and an orthogonal second axis representing a quadrature component. The apparatus includes a processing unit configured to select one of a plurality of segments of the constellation diagram containing the symbol. The segment is delimited by two radially extending boundaries, wherein the two radially extending boundaries span an opening angle of the segment that is different from 90°. The processing unit is further configured to calculate a first coordinate of the symbol with respect to a third axis, and a second coordinate of the symbol with respect to a fourth axis. At least one of the third axis and the fourth axis coincides with one of the two radially extending boundaries. The apparatus further includes a plurality of digital-to-analog converter cells configured to generate the radio frequency signal using the first coordinate and the second coordinate.

25 Claims, 5 Drawing Sheets

(56) References Cited

U.S. PATENT DOCUMENTS

| | | | |
|---|---|---|---|
| 2005/0238114 A1 | 10/2005 | Ishikawa et al. | |
| 2009/0135926 A1* | 5/2009 | Tsouri | H04L 5/02 |
| | | | 375/260 |
| 2010/0260280 A1* | 10/2010 | Sundar Rajan | H04L 1/0071 |
| | | | 375/267 |
| 2011/0075780 A1* | 3/2011 | Petrovic | H03M 1/0614 |
| | | | 375/355 |
| 2014/0146917 A1* | 5/2014 | Muhammad | H03F 1/3241 |
| | | | 375/297 |

* cited by examiner

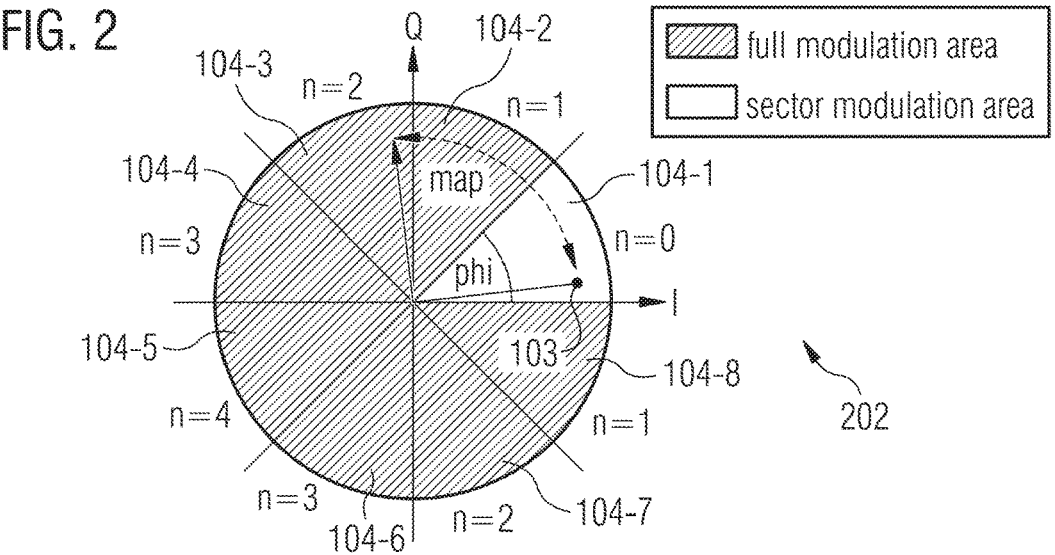
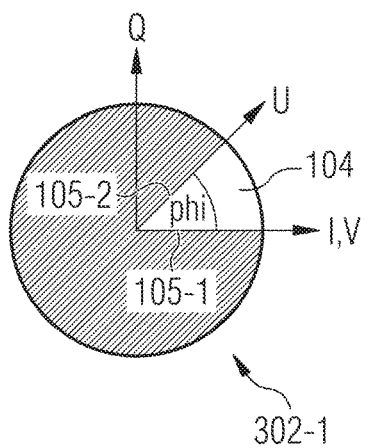
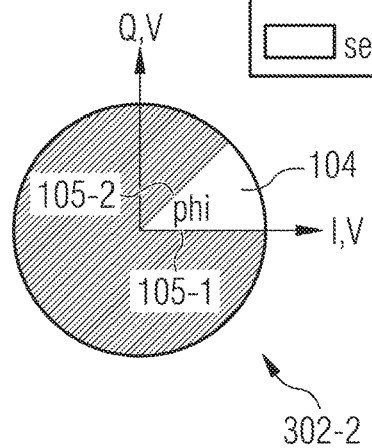
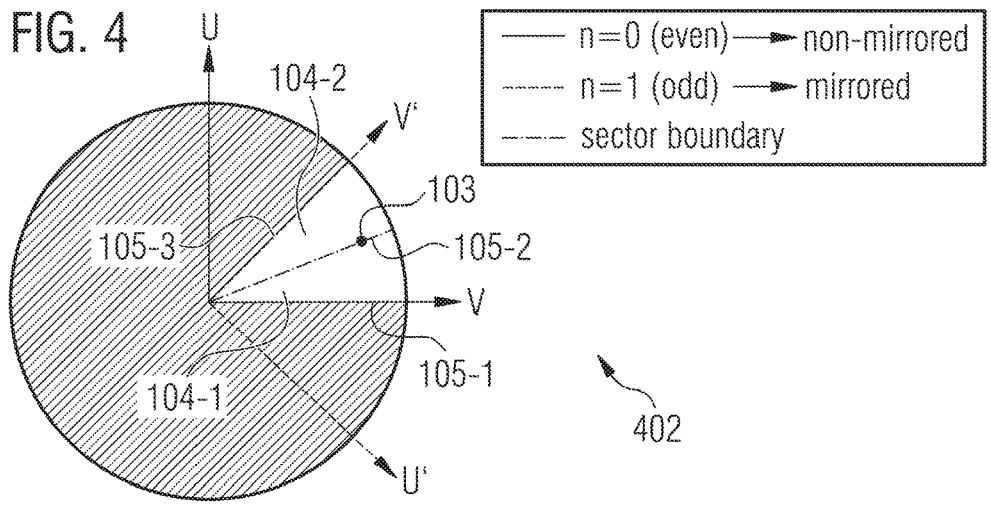

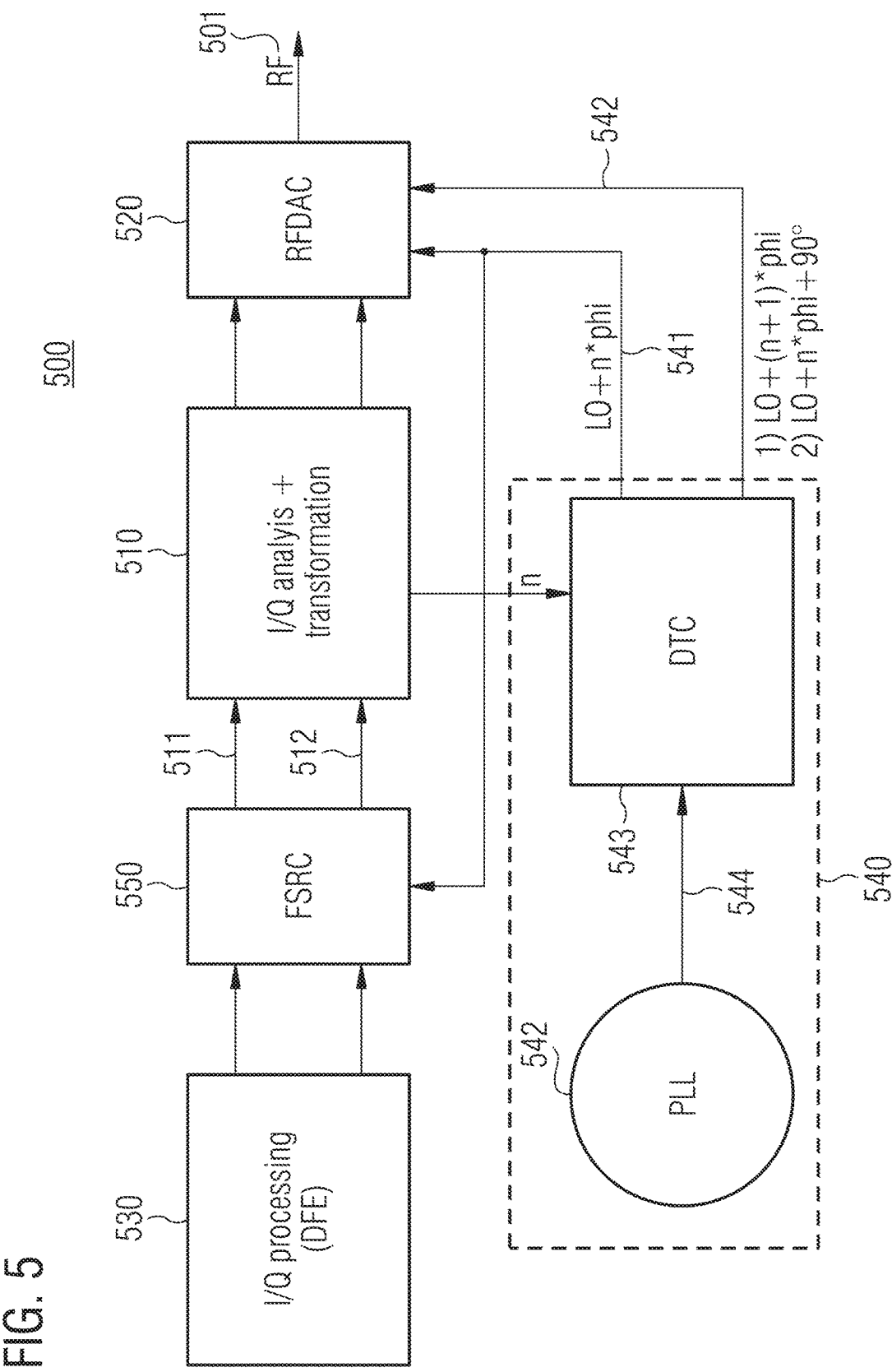

APPARATUS AND A METHOD FOR GENERATING A RADIO FREQUENCY SIGNAL

FIELD

Examples relate to wireless transmitter technology. In particular, examples relate to an apparatus and a method for generating a radio frequency signal based on a symbol in a constellation diagram.

BACKGROUND

Modern wireless transmitters (e.g. for cellular communication, Bluetooth communication or Wi-Fi communication) are dominated by two architectures: Cartesian (I/Q) transmitters and polar transmitters.

A Cartesian transmitter uses a Radio Frequency Digital-to-Analog Converter (RF-DAC) to generate a modulated radio frequency (RF) signal directly from a complex valued symbol having an in-phase component and a quadrature component. Two Local Oscillator (LO) signals of a same frequency, shifted by 90°, are used to clock the RF-DAC. The LO signals represent the in-phase and quadrature axes (vectors) of the constellation diagram. Cartesian architecture may handle modulation schemes with high bandwidth, but has a lower efficiency than polar architecture.

In polar architecture, a symbol is expressed by phase and amplitude information. Conventional polar transmitters may use a Phase-Locked-Loop (PLL) for phase modulation of a LO signal. More sophisticated polar transmitters may use a Digital-to-Time Converter (DTC) to apply phase modulation and/or frequency shifts on a constant LO signal. The modulated output of the DTC may be used to clock a RF-DAC. The RF-DAC may apply amplitude modulation and adjust an output power of the RF signal. One advantage of polar architecture including a DTC may be a high efficiency of the output stage and that only a single PLL may provide the LO signal for multiple transmitters. However, handling RF signals with a wide bandwidth is problematic with polar architecture.

Hence, there may be a desire for an improved transmitter architecture.

BRIEF DESCRIPTION OF THE FIGURES

Some examples of apparatuses and/or methods will be described in the following by way of example only, and with reference to the accompanying figures, in which

FIG. 2 illustrates an example of a constellation diagram comprising a plurality of segments;

FIG. 3a illustrates an example of a constellation diagram comprising a segment, wherein a third axis and a fourth axis coincide with the two radially extending boundaries of the segment;

FIG. 3b illustrates an example of a constellation diagram comprising a segment, wherein a third axis and a fourth axis span an angle of 90°;

FIG. 4 illustrates an example of a constellation diagram comprising two opposed segments;

FIG. 5 illustrates another example of an apparatus for generating a RF signal based on a symbol within a constellation diagram;

DETAILED DESCRIPTION

Figure 1:
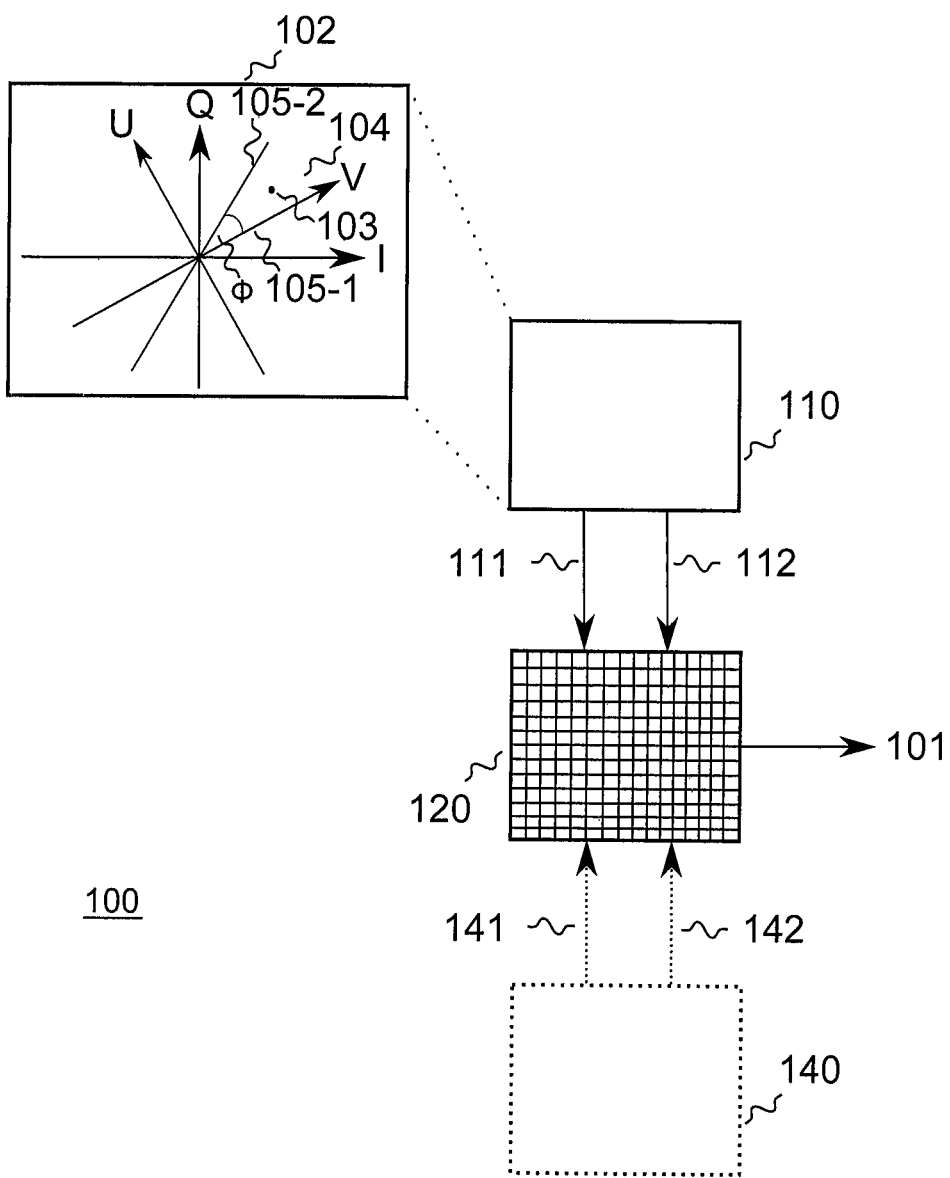
FIG. 1 illustrates an example of an apparatus for generating a RF signal based on a symbol within a constellation diagram.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent,", to name just a few examples.

The terminology used herein is for the purpose of describing particular examples is not intended to be limiting for further examples. Whenever a singular form such as "a," "an" and "the" is used and using only a single element is neither explicitly or implicitly defined as being mandatory, further examples may also plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (EUTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In some examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates an apparatus 100 for generating a RF signal 101 based on a symbol 103 within a constellation diagram 102. The constellation diagram 102 is spanned by a first axis I representing an in-phase component and an orthogonal second axis Q representing a quadrature component, i.e., the first and second axes I, Q may be regarded as real and imaginary axes of a complex plane for the (complex valued) symbol 103. The symbol 103 is related to a baseband signal. For example, the symbol 103 represents a (complex valued) sample of the baseband signal.

The apparatus 100 comprises a processing unit 110 for selecting one segment 104 of a plurality of segments of the constellation diagram 102 that contains the symbol 103. The segment 104 is delimited by two radially extending boundaries 105-1, 105-2, which span an opening angle Φ of the segment 104 that is different from 90°. For example, 360° may be a multiple integer of the opening angle Φ. That is, the opening angle Φ may in some examples be equal to 120°, 72°, 60°, 51.43° (360/7°), 45°, 40°, 36°, 30°, 22.5°, 20°, 18°, 15°, 11.25°, 10°, 9°, 6°, 5°, 4.5°, 3°, 2°, 1° or 0.5°. In other words, the constellation diagram 102 may contain an integer number of similar segments. An example is illustrated in FIG. 2, in which the constellation diagram 102 comprises eight segments 104-1, ..., 104-8, wherein each of the segments 104-1, ..., 104-8 has an opening angle Φ=45°. Alternatively, the segments may in some examples have different opening angles, i.e., not at all segments of the plurality of segments may have the same opening angle. The opening angle Φ may in some examples be determined according to $$\Phi = \tan^{-1}(2^{-n}) \qquad (1),$$

with $\tan^{-1}$ denoting the arctangent function, and n being an integer number.

At least one of a third axis V and a fourth axis U coincides with one of the two radially extending boundaries 105-1, 105-2. For example, as illustrated in FIG. 1, the third axis V may coincide with the radially extending boundary 105-1, whereas the fourth axis U does not coincide with the other radially extending boundary 105-2. Another example is given in FIG. 3b, in which the one segment 104 has an opening angle Φ=45°, and where the third axis V coincides with the one radially extending boundary 105-1 of the segment 104, whereas the fourth axis U does not coincide with the other radially extending boundary 105-2. In some examples, both the third axis V and the fourth axis U may coincide with the two radially extending boundaries 105-1, 105-2 of the segment 104 as illustrated in FIG. 3a, in which the one segment 104 has an opening angle Φ=45°. Both the third axis V and the fourth axis U cross the origin of the respective constellation diagram 102, 202, 302-1, 302-2.

The third and fourth axes V, U may be different from the first and second axes I, Q, i.e., none of the third and fourth axis V, U may in some examples coincide with the first and second axes I, Q as, e.g., illustrated in FIG. 1. In some examples, one of the third and fourth axes V, U may be equal to one of the first and second axes I, Q, i.e., one of the third and fourth axis V, U may coincide with one of the first and second axes I, Q as, e.g., illustrated in FIG. 3a. In other words, at least one of the third and fourth axes V, U may be different from the first and second axes I, Q, if the other of the third and fourth axes V, U coincides with one of the first and second axes I, Q.

As illustrated in FIG. 1 and FIG. 3b, the third axis V and the fourth axis U may in some examples span an angle of 90°, i.e., the third axis V and the fourth axis U may be orthogonal. In some examples, the third axis V and the fourth axis U may span an angle different from 90° as illustrated in FIG. 3a. The third and fourth axes V, U may, e.g., span angle smaller than 90°. For example, the angle spanned by the third and fourth axes V, U may be equal to the opening angle Φ of the one segment 104 as illustrated in FIG. 3a.

The processing unit 110 of the apparatus 100 illustrated in FIG. 1 calculates a first coordinate 111 of the symbol 103 with respect to the third axis V, and a second coordinate 112 of the symbol 103 with respect to the fourth axis U. In other words, the processing unit transforms the coordinates of the symbol 103 with respect to the first and second axes I, Q to coordinates with respect to the third and fourth axes V, U. If the third and fourth axes V, U span an angle of 90°, the coordinate transformation may be understood as a rotation of the coordinate axes.

The first coordinate 111 and the second coordinate 112 are provided to a plurality of digital-to-analog converter (DAC) cells 120. In some examples, the plurality of digital-to-analog converter cells 120 are comprised by a single Digital-to-Analog Converter (DAC) (e.g. a RF-DAC). In some examples, the plurality of digital-to-analog converter cells 120 may be comprised by two or more DACs (e.g. by two RF-DACs). The plurality of DAC cells 120 generate the RF signal 101 using at least (a signal or information related to) the first coordinate 111 and the second coordinate 112.

The apparatus 100 (as part of a transmitter) may allow higher signal bandwidths for the RF signal 101 compared to polar transmitter architecture. Compared to Cartesian transmitter architecture, an efficiency (power) loss of the transmitter 100 may be reduced since LO signals having a phase shift smaller than 90° may be used for the plurality of DAC cells 120. In particular, a necessary dynamic range of the LO signals may be reduced compared to conventional Cartesian transmitter architecture. Furthermore, the increased efficiency compared to Cartesian transmitter architecture may allow to reduce the number of DAC cells compared to a Cartesian transmitter architecture. Accordingly, a complexity and a current consumption of the apparatus 100 may be reduced compared to Cartesian transmitter architecture.

In other words, the full 360° complex plane may be mapped into several sectors of phase range Φ smaller than 90° in order to reduce dynamic ranges of the modulation signals. That is, LO signals with angles like 0°, 22.5°, 45°, 67.5° etc. may be used for modulation.

As standard I/Q (Cartesian) modulators use DACs for both I and Q, the inefficiency results in a higher amount of necessary DAC cells, or, if the total amount of DAC cells is given, reduced output power (assuming that a maximum output power is related to a maximum number of used DAC cells) compared to, e.g., polar modulation, which uses a magnitude DAC. Reduced output power also lowers efficiency, since it effectively means working with higher power backoff, causing an efficiency drop.

With the proposed concept, modulation may be done with only marginal reduction of output power compared to polar modulation with given DAC designs, i.e., with increased output power compared to I/Q modulation. In particular, a sector size dependent output power/efficiency gain may be achieved. For example, an output power of the apparatus 100 may be less than 1 dB (Decibel) distant to polar modulation for Φ=45° and the third and fourth axes V, U coinciding with the two radially extending boundaries 105-1, 105-2. For example, the output power may be less than 1 dB distant to polar modulation for Φ=11.5° and the third and fourth axes V, U spanning an angle of 90°. As a comparison, the output power for conventional I/Q modulation is up to 6 dB distant to polar modulation.

Moreover, signal processing requirements may be more or less the same than for standard I/Q modulation. Compared to polar modulation this may allow highly reduced bandwidth requirements. Especially for high bandwidth signals (e.g. for multiple carrier aggregation) this may be a benefit.

Additionally, small segment sizes may improve harmonic problems (e.g. intermodulation) compared to conventional I/Q modulation, as the vector modulator effectively sees a phase modulated LO signal that is comparable to polar modulation approach.

If the third and fourth axes V, U coincide with the two radially extending boundaries 105-1, 105-2, smooth segment transitions may be allowed since exactly at the boundary one vector (coordinate related to one of the third and fourth axes V, U) is zero and the other vector (coordinate related to the other of the third and fourth axes V, U) is flat (i.e. the coordinate undergoes none or a small change) when entering/leaving a segment.

If the third and fourth axes V, U span an angle of 90°, the modulation by the DAC cells may be considered to effectively converge towards polar modulation for small segment sizes as V is effectively converging to an amplitude and U is effectively converging to a phase (as sin(x) gets closer to x). The advantage of having "phase" information in an orthogonal signal may be that resolution and spectral requirements may be more relaxed. This may be valid especially for high amplitudes, where the phase needs to be very accurate for limited Error Vector Magnitudes (EVM) and spectral emissions (i.e. a high resolution may thus enabled). The "phase" (U) information may be added in a linear way to the "amplitude" (V) information (e.g. the signal bandwidth (BW) of both signals may be just once the LTE signal BW).

For an opening angle Φ greater than 90°, a current consumption of the apparatus 100 may be reduced compared to conventional transmitter architectures. For example, if only a small fraction of the plurality of DAC cells 120 is used (active), the current consumption of a decoder for controlling the plurality of DAC cells 120 based on the first and second coordinates 111, 112 is dominant compared to the current consumption of the active DAC cells. Using an opening angle Φ greater than 90° (e.g. Φ=120°) may slightly increase the current consumption of the active DAC cells compared to conventional Cartesian modulation, however, the current consumption of the decoder may be reduced to a greater extent. Accordingly, an overall power consumption may be reduced.

Hence, the apparatus 100 may avoid drawbacks of conventional polar transmitter architecture and conventional Cartesian transmitter architecture.

In some examples, the processing unit 110 selects the opening angle Φ based on a desired characteristic of the RF signal 101. This may allow to select a most suitable opening angle Φ for a desired signal characteristic. The selected opening angle Φ may, e.g., allow to generate the RF signal 101 with reduced of out-of-band noise, or with a minimum current consumption. For example, the characteristic may be the (desired) frequency of the RF signal 101. Accordingly, different (most suitable) opening angles Φ may be used for different frequencies or frequency ranges (bands) of the RF signal 101.

In some examples, the plurality of digital-to-analog converter cells 120 further generates the RF signal 101 based on a first LO signal 141 and a second LO signal 142. The first and second LO signals 141, 142 comprise a phase difference equal to the angle spanned by the third axis V and the fourth axis U. For example, the plurality of digital-to-analog converter cells 120 generates a first RF component using the first coordinate 111 and the first LO signal 141, and a second RF component using the second coordinate 112 and the second LO signal 142. In some examples, a first part of the plurality of digital-to-analog converter cells 120 may generate the first RF component, and a second part of the plurality of digital-to-analog converter cells 120 may generate the second RF component. For example, the number of digital-to-analog converter cells (e.g. the number of active cells of the first part) for generating the first RF component may be related (e.g. proportional) to the first coordinate, and the number of digital-to-analog converter cells (e.g. the number of active cells of the second part) for generating the second RF component may be related (e.g. proportional) to the second coordinate. The apparatus 100 may further comprise a signal combiner (not illustrated) for combining the first radio frequency component and the second radio frequency component to the RF signal 101.

As indicated above, using LO signals 141, 142 having a phase difference of less than 90° (for an opening angle Φ of less than 90°) may allow to increase the efficiency of the apparatus 100 compared to conventional Cartesian transmitter architecture. Furthermore, LO signals 141, 142 having a phase difference of more than 90° (for an opening angle Φ of more than 90°) may allow to reduce an overall power consumption of the plurality of DAC cells 120 and a decoder (not illustrated) for controlling the DAC cells based on the first and second coordinates 111, 112.

In some examples, the apparatus 100 is only operated if a ratio of a desired power of the RF signal 101 and a maximum power of the RF signal 101 that is achievable (i.e. that can be generated) by the plurality of DAC cells 120 (using the specific first and second LO signals 141, 142) satisfies a quality criterion. For example, the desired power of the RF signal 101 may be not more than 24 dB lower than the maximum power of the RF signal 101. Hence, it may be assured that a required current for calculating the first and second coordinates 111, 112 from the input I and Q coordinates is lower than the current saved by the plurality of the DAC cells 120 compared to conventional Cartesian modulation due to the increased efficiency. Accordingly, a current consumption of a transmitter (comprising the apparatus 100) may be minimum.

The apparatus 100 (as part of a transmitter) may in some examples only be operated if a desired bandwidth of the RF signal 101 is higher than a threshold value. For example, the apparatus 100 may only be used for generating RF signals having a rather high signal bandwidth. For signals having a bandwidth smaller than the threshold value, the transmitter may, e.g., use polar modulation.

Generally speaking, some examples relate to a means for generating a radio frequency signal based on a symbol within a constellation diagram spanned by a first axis representing an in-phase component and an orthogonal second axis representing a quadrature component. The means comprises a means for selecting one of a plurality of segments of the constellation diagram containing the symbol. The segment is delimited by two radially extending boundaries, wherein the two radially extending boundaries span an opening angle of the segment that is different from 90°. The means for selecting is further configured to calculate a first coordinate of the symbol with respect to a third axis, and a second coordinate of the symbol with respect to a fourth axis. At least one of the third axis and the fourth axis coincides with one of the two radially extending boundaries. The means further comprises a means for generating the radio frequency signal using the first coordinate and the second coordinate.

The means for generating a radio frequency signal may be implemented by an apparatus for generating a radio frequency signal described above or below (e.g. FIG. 1). The means for selecting may be implemented by a processing unit described above or below (e.g. FIG. 1).

The means for generating the radio frequency signal using the first coordinate and the second coordinate may be implemented by a plurality of digital-to-analog converter cells described above or below (e.g. FIG. 1).

FIG. 4 illustrates a constellation diagram comprising a two opposed segments 104-1, 104-2. The first segment 104-1 is delimited the two radially extending boundaries 105-1 and 105-2. The third axis V and the fourth axis U are associated to the first segment 104-1. The third axis V coincides with the first radially extending boundary 105-1.

The second segment 104-2 is adjacent to the first segment 104-1. That is, the second radially extending boundary 105-2 delimits both the first segment 104-1 and the second segment 104-2. The second segment 104-2 is further delimited by a third radially extending boundary 105-3. A fifth axis V' and a sixth axis U' are associated to the second segment 104-2. The fifth and sixth axes V', U' span an angle of 90° as the third and fourth axes V, U do.

A symbol 103 is positioned at the second radially extending boundary 105-2, i.e., the symbol 103 is positioned at the one of the two radially extending boundaries 105-1 and 105-2 that delimits the first segment 104-1 from the second segment 104-2. In other words, the second segment 104-2 is mirrored to first segment 104-1, wherein the radially extending boundary 105-2 that delimits the first segment 104-1 from the second segment 104-2 is the mirror axis.

Hence, the first coordinate of the symbol 103 with respect to the third axis V is equal to a third coordinate of the symbol 103 with respect to the fifth axis V'. Accordingly, the second coordinate of the symbol 103 with respect to the fourth axis U is equal to a fourth coordinate of the symbol 103 with respect to the sixth axis U'.

More general, for fifth and sixth axes associated to the second segment and spanning an angle of 90°, one of the first and second coordinates is equal to a third coordinate of the symbol with respect to the fifth axis, and the other of the first and second coordinates is equal to a fourth coordinate of the symbol with respect to the sixth axis.

Figure 6:
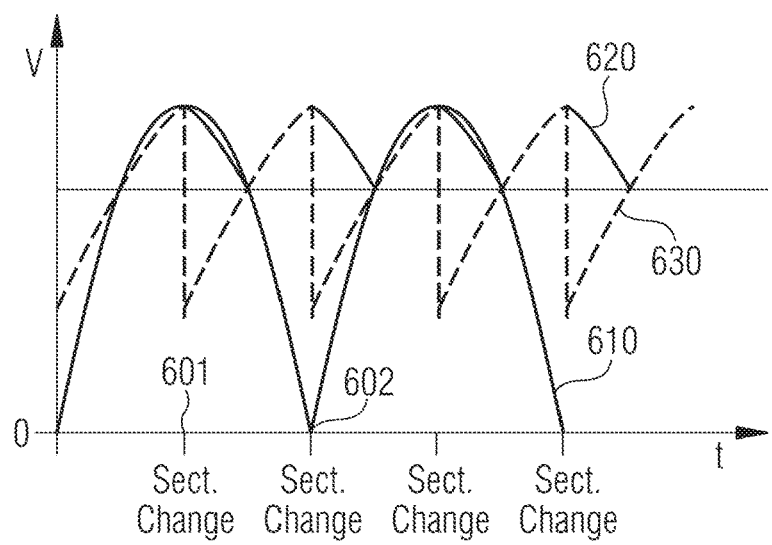
FIG. 6 illustrates an example of a comparison of a plurality of input signals for a digital-to-analog converter generated according to examples described herein.

With the mirrored sectors, a continuous signal during a sector change may be enabled (see also FIG. 6). For example, every second sector (i.e. all odd or all even sectors) may be mirrored as indicated by FIG. 4.

In other words, for achieving continuous signals during sector changes, sector mirroring may be used. For example, V and U with +90° relative shift may be used only for even sector numbers, whereas V' and U' may be shifted by −90° for odd sector numbers. This may result in the same values of V and V', and U and U' in both sectors on the sector boundary (see also FIG. 6). Hence, the sector boundary may be regarded as "mirror axis".

FIG. 5 illustrates another apparatus 500 for generating a RF signal 501 based on a symbol within a constellation diagram. The apparatus 500 comprises a signal processing unit 530 for processing a baseband signal comprising an in-phase and a quadrature component, i.e., information on the symbol within the constellation diagram. A Fractional Sample Rate Converter (FSRC) is used to up-sample the baseband signal to a frequency of the RF-DAC 520. The information on the frequency of the RF-DAC 520 may be gathered from one of the first and second LO signals 541, 542 for the RF-DAC 520 (e.g. from the first LO signal 541).

The processing unit 510 selects a sector within the constellation diagram for the symbol and calculates the first and second coordinates 511, 512 of the symbol with respect to the third and fourth axes associated to the selected sector. The coordinates 511, 512 are provided to the RF-DAC 120.

A PLL 542 and a DTC 543 effectively act as a multi-phase generator 540 for providing the first and second LO signals 541, 542. The PLL 542 provides a reference LO signal 544 to the DTC with a frequency that is N times (N is an integer) the operation frequency of the PLL 542.

The DTC 543 receives information on the selected segment (e.g. the sector number) from the processing unit 510. The DTC 543 uses a reference LO signal and the information on the selected segment together with the opening angle $\Phi$ of the selected segment to generate the first LO signal 541 for the RF-DAC 520.

For example, the DTC 543 provides the first LO 541 signal with a frequency $f_{LO}$ and a phase LO+n*$\Phi$, with LO denoting the phase of the reference LO signal 544 and n being the number of the selected sector (e.g. see FIG. 2 for exemplary sector numbers).

Furthermore, the DTC 543 provides the second LO signal 542 with the frequency $f_{LO}$. The phase of the second LO signal 542 is based on the angle spanned by third and fourth axes. For example, if the third and fourth axes coincide with the radially extending boundaries of the segment (i.e. the third and fourth axes span angle different from 90°), the phase may be LO+(n+1)*$\Phi$. For example, if the third and fourth axes span angle equal to 90°, the phase may be LO+n*$\Phi$+90°.

The RF-DAC 542 uses the first and second coordinates 511, 512 and the first and second LO signals 541, 542 to generate the RF signal 501 by digital-to-analog conversion and up-mixing.

Different phase shifts between the first and second LO signal 511, 512 may require different delays within the coordinate path to the RF-DAC 520, i.e., a variable delay may be needed in the signal path constituted by the signal processing unit 530, the FSRC 550 and the processing unit 510. For example, a delay element (e.g. a Finite Impulse Response, FIR, filter) may be implemented between the FSRC 550 and the processing unit 510. In some examples, the FSRC 550 itself may be used as delay element.

In some examples, the processing unit 510 may be arranged upstream of the FSRC 510, i.e., between the signal processing unit 530 and the FSRC 550. This may allow to determine the segment and to calculate the first and second coordinates at a lower rate. Accordingly, a current consumption of the processing unit 510 may be reduced.

In other words, signal processing may be done by standard I/Q processing (e.g. with a low bandwidth). A FSRC may be used to up-sample the signal to RF-DAC frequency. I/Q analysis may be used to derive the sector number for each sample, and a transformation may perform the according vector rotation (mapping). Via the RF-DAC digital-to-analog conversion and up-mixing may be realized. The LO path may have a LO source and a DTC having two output signals. The phase shift between the LO signals (i.e. phase of the DTC+90°, or phase of the DTC+opening angle of the segment) may in some examples be generated separately (i.e. downstream of the DTC 543).

FIG. 6 illustrates an example of a comparison of a plurality of input signals 610, 620, 630 for a DAC generated according to examples described herein. The input signals 610, 620, 630 represent the temporal course of one respective calculated coordinate per segment of the constellation diagram. Furthermore, the input signals 610, 620, 630 are complex tone input signals, i.e., signals with a constant amplitude modulation, and a varying (e.g. ramped) phase modulation.

Signal 610 illustrates a situation where the third and fourth axes coincide with the radially extending boundaries of the segment (e.g. see FIG. 3a). The symbol is first located at the radially extending boundary that coincides with the fourth axis U, so that the second coordinate related to the fourth axis U is maximum, and the first coordinate related to the third axis V is zero. Then, the symbol moves at fixed distance to the origin of the constellation diagram counter-clockwise or clock-wise around the origin. Accordingly, the symbol moves closer to the other boundary that coincides with the third axis V, so that the first coordinate is maximum. Accordingly, the second coordinate related to the fourth axis is zero. For the coordinate that is zero or close to zero at the boundary of the segment, the phase of the respective LO signal is changed by twice the opening angle $\Phi$ at a segment change. Accordingly, the axis corresponding to the coordinate that is zero or close to zero is rotated by twice the opening angle $\Phi$. In the situation illustrated in FIG. 6, the fourth axis U is rotated by twice the opening angle $\Phi$ at the first segment change 601. If the symbol moves on, i.e., moves away from the third axis and moves closer to the other boundary that coincides with the rotated fourth axis U, the first coordinate decreases to zero again. At the second segment change 602, the LO signal for the third axis V changes by twice the opening angle $\Phi$, so that the third axis is effectively rotated by twice the opening angle $\Phi$ in the constellation diagram.

In other words, the phase of a LO signal for the signal (coordinate) that has currently value close to 0 (V or U) may change at a segment change to a 2 over LO signal, i.e., from LO+n*$\Phi$ to LO+(n+2)*$\Phi$. This assumes that the DAC cells can be freely allocated to V and U.

Signal 630 illustrates a situation where the third and fourth axes V, U span an angle of 90°. The symbol is first located at the radially extending boundary that coincides with the fourth axis U, so that the second coordinate related to the fourth axis U is maximum, and the first coordinate related to the third axis V is minimum. Then, the symbol moves at fixed distance to the origin of the constellation diagram counter-clockwise or clock-wise around the origin. Accordingly, the symbol moves closer to the other boundary of the segment. Accordingly, the first coordinate is increased to the maximum, whereas the second coordinate related to the fourth axis decreases to the minimum. At the other boundary, i.e., at the segment change, the phase of the respective LO signal is changed by the opening angle $\Phi$ for both axes. Accordingly, the third and fourth axes are both effectively rotated by the opening angle $\Phi$ in the constellation diagram. Hence, the symbol is again at the fourth axis U at the first segment change 601, and the temporal course of the signal repeats.

In other words, at a sector change both signals (related to V and U) switch their LOs, i.e., from LO+n*Φ to LO+(n+1)*Φ for V, and from LO+n*Φ+90° to LO+(n+1)*Φ+90° for U.

Signal 620 illustrates a situation where the third and fourth axes V, U span an angle of 90°, and where every second segment is mirrored (e.g. as explained in connection with FIG. 4). The symbol is first located at the radially extending boundary that coincides with the fourth axis U, so that the second coordinate related to the fourth axis U is maximum, and the first coordinate related to the third axis V is minimum. Then, the symbol moves at fixed distance to the origin of the constellation diagram counter-clockwise or clock-wise around the origin. Hence, the symbol moves closer to the other boundary of the segment. Accordingly, the first coordinate is increased to the maximum, whereas the second coordinate related to the fourth axis decreases to the minimum. At the other boundary, i.e., at the segment change, the phase of the LO signal is changed by the twice the opening angle Φ for one of the axes, and the phase of the LO signal is changed by the twice the opening angle Φ plus 90° in reverse direction for the other axis. Accordingly, the third axis is rotated by twice the opening angle Φ in the constellation diagram, and the fourth axis is rotated reversely by twice the opening angle Φ plus 90° in the constellation diagram. Hence, the coordinates of the symbol with respect to the third and fourth axes are equal to the coordinates of the symbol with respect to the rotated third and fourth axes at the first segment change 601, and the further temporal course of the signal is inverse.

In other words, with segment mirroring, at a sector change still both signal change the phases of their LOs, but with −90° phase shift every second sector, i.e., from LO+n*Φ to LO+(n+2)*Φ for V, and from LO+n*Φ+90° to LO+(n+2)*Φ−90° for U.

Figure 7:
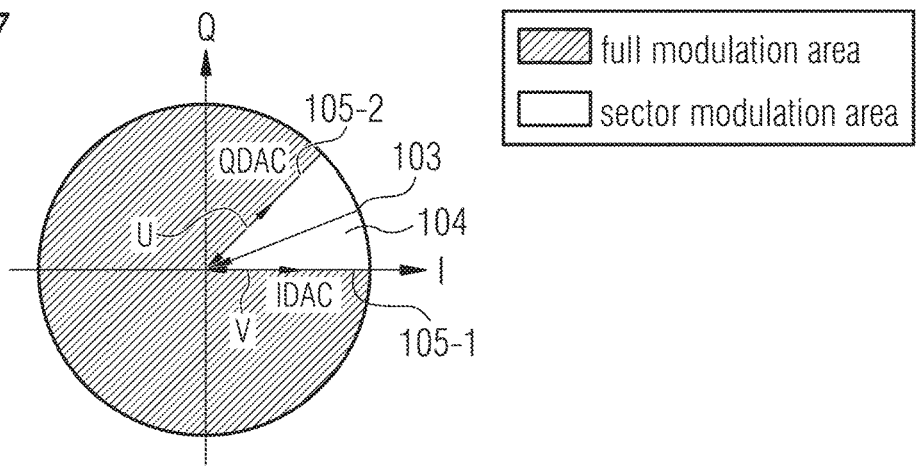
FIG. 7 illustrates an example of a relation between an occupancy of a digital-to-analog converter and a segment size.

A beneficial effect of sector sizes smaller than 90° is illustrated in FIG. 7, which illustrates a relation between an occupancy (DAC cell coverage) of a DAC and the segment size. In the situation illustrated in FIG. 7, the third and fourth axes V, U coincide with the radially extending boundaries 105-1, 105-2 of the segment.

In order to be able to modulate the symbol 103, a conventional Cartesian transmitter requires a DAC having a first plurality of DAC cells for the I component (IDAC) and a second plurality of DAC cells for the Q component (QDAC). However, using coordinates related to the third and fourth axes V, U requires a smaller average number of DAC cells since, for a decreasing opening angle of the segment 104, one of the axes adds both components to the required vector for symbol 103.

In other words, when modulating with vectors as illustrated in FIG. 6, the average cell usage may decrease for smaller sector sizes, as for large vectors IDAC and QDAC add both parts into vector direction.

Figure 8:
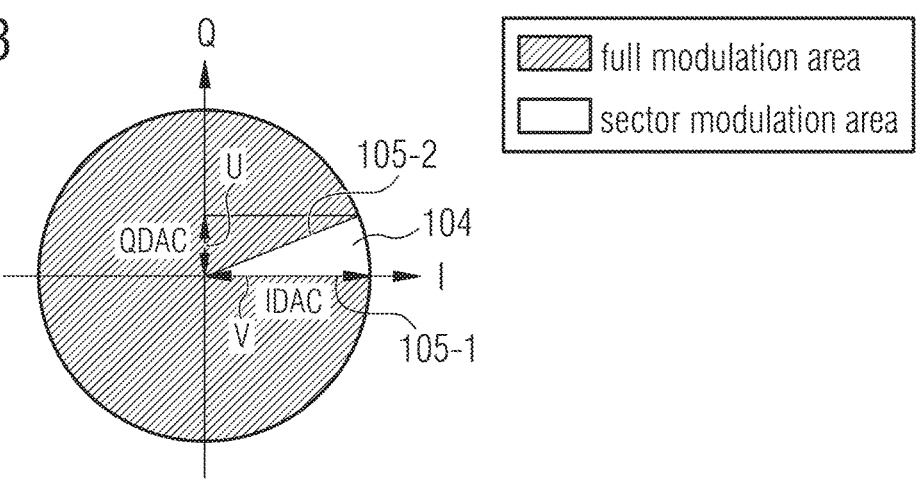
FIG. 8 illustrates another example of a relation between an occupancy of a digital-to-analog converter and a segment size.

FIG. 8 illustrates another relation between an occupancy (DAC cell coverage) of a DAC and a segment size for a situation where the third and fourth axes V, U span an angle of 90°. As indicated, for the component related to the third axis V, a DAC with a same dynamic range as for the I component in a conventional Cartesian transmitter may be used in order to modulate a symbol in the segment 104. However, for the component related to the fourth axis U, a DAC with a smaller dynamic range as for the Q component in a conventional Cartesian transmitter may be used. Hence, a number of required DAC cells may be reduced, or an output power of the DAC may be increased maintaining the number of DAC cells.

In other words, I/Q modulation of a small sector may be done with a standard dynamic range IDAC and a small dynamic range QDAC. Hence, the power drawback of I/Q modulation may decrease with smaller sector size. For example, a sector size of 11.25° may have 0.77 dB output power penalty compared to polar modulation. Although a finer sector size is needed, an advantage may be that the sector modulation itself stays orthogonal. Hence, error effects in the generated RF signal may be similar to standard I/Q.

Figure 9:
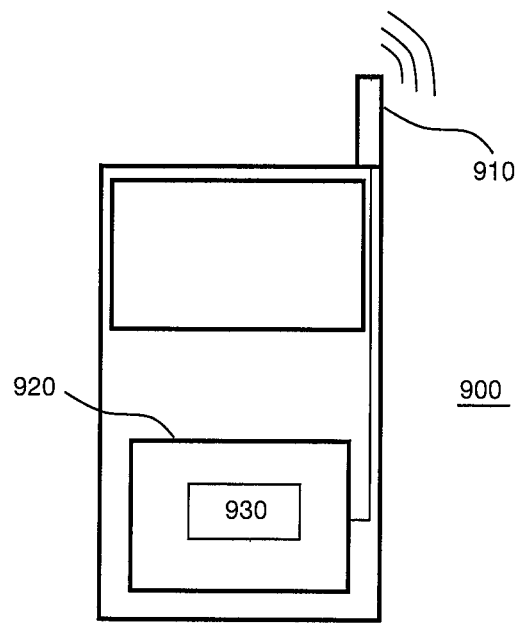
FIG. 9 illustrates an example of a mobile communications device comprising an apparatus for generating a RF signal based on a symbol within a constellation diagram.

An example of an implementation using RF signal generation according to one or more aspects of the proposed concept or one or more examples described above is illustrated in FIG. 9. FIG. 9 schematically illustrates an example of a mobile communications device or mobile phone or user equipment 900 comprising an apparatus 930 for generating a RF signal based on a symbol within a constellation diagram (e.g. related to a baseband signal) according to an example described herein. The apparatus 930 may be comprised in a transmitter 920. An antenna element 910 of the mobile communications device 900 may be coupled to the transmitter 920. To this end, mobile communications devices may be provided with improved signal transmission characteristics (e.g. offering high signal bandwidth and high efficiency). For example, the mobile communications device 900 may allow efficient wideband modulation beyond 40 MHz. Hence, multiple (also non-contiguous) uplink carrier aggregation using one transmit signal stream (i.e. one LO for multiple aggregated carriers) may be possible.

Figure 10:
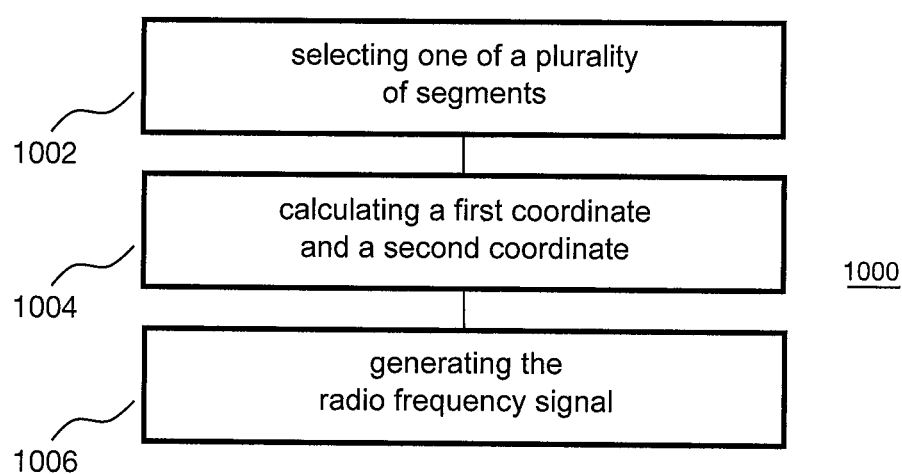
FIG. 10 illustrates a flowchart of an example of a method for generating a RF signal based on a symbol within a constellation diagram.

An example of a method 1000 for generating a RF signal based on a symbol within a constellation diagram is illustrated by means of a flowchart in FIG. 10. The constellation diagram is spanned by a first axis representing an in-phase component and an orthogonal second axis representing a quadrature component. The method comprises selecting 1002 one of a plurality of segments of the constellation diagram containing the symbol. The segment is delimited by two radially extending boundaries, wherein the two radially extending boundaries span an opening angle of the segment that is different from 90°. Further, the method comprises calculating 1004 a first coordinate of the symbol with respect to a third axis, and a second coordinate of the symbol with respect to a fourth axis. At least one of the third axis and the fourth axis coincides with one of the two radially extending boundaries. The method further comprises generating 1006 the RF signal using the first coordinate and the second coordinate.

More details and aspects of the method are mentioned in connection with the proposed concept or one or more examples described above (e.g. FIGS. 1-5). The method may comprise one or more additional optional features corresponding to one or more aspects of the proposed concept or one or more examples described above.

The examples as described herein may be summarized as follows:

Example 1 is an apparatus for generating a radio frequency signal based on a symbol within a constellation diagram spanned by a first axis representing an in-phase component and an orthogonal second axis representing a quadrature component, the apparatus comprising: a processing unit configured to select one of a plurality of segments of the constellation diagram containing the symbol, wherein the one segment is delimited by two radially extending boundaries, the two radially extending boundaries spanning an opening angle of the segment being different from 90°, wherein the processing unit is further configured to calculate a first coordinate of the symbol with respect to a third axis, and a second coordinate of the symbol with respect to a fourth axis, wherein at least one of the third axis and the fourth axis coincides with one of the two radially extending boundaries; and a plurality of digital-to-analog converter cells configured to generate the radio frequency signal using the first coordinate and the second coordinate.

In example 2, at least one of the third and fourth axes is different from the first and second axes in the apparatus of example 1, if the other of the third and fourth axes coincides with one of the first and second axes.

In example 3, the third axis and the fourth axis span an angle of 90° in the apparatus of example 1 or example 2.

In example 4, one of a fifth axis and a sixth axis spanning an angle of 90° coincides with a third radially extending boundary of a second segment adjacent to the one segment in the apparatus of example 3, wherein the symbol is positioned at the one of the two radially extending boundaries that delimits the first segment from the second segment, wherein one of the first and second coordinates is equal to a third coordinate of the symbol with respect to the fifth axis, and wherein the other of the first and second coordinates is equal to a fourth coordinate of the symbol with respect to the sixth axis.

In example 5, the third axis and the fourth axis coincide with the two radially extending boundaries of the segment in the apparatus of example 1 or example 2.

In example 6, 360° is a multiple integer of the opening angle in the apparatus of any of the preceding examples.

In example 7, $\Phi=\tan^{-1}(2^{-n})$ in the apparatus of any of examples 1 to 5, with $\Phi$ denoting the opening angle, $\tan^{-1}$ denoting the arctangent function, and n being an integer number.

In example 8, the opening angle is smaller than 90° in the apparatus of any of the preceding examples.

In example 9, the processing unit of the apparatus of any of the preceding examples is configured to select the opening angle based on a desired characteristic of the radio frequency signal.

In example 10, the characteristic in the apparatus of example 9 is the frequency of the radio frequency signal.

In example 11, the plurality of digital-to-analog converter cells of the apparatus of any of the preceding examples is further configured to generate the radio frequency signal based on a first local oscillator signal and a second local oscillator signal comprising a phase difference equal to an angle spanned by the third axis and the fourth axis.

In example 12, the apparatus of example 11 further comprises a multi-phase generator, wherein the multi-phase generator is configured to: generate the first local oscillator signal using a reference local oscillator signal, the opening angle, and information on the one segment; and generate the second local oscillator signal using the reference local oscillator signal, the opening angle, the information on the one segment, and the angle spanned by the third axis and the fourth axis.

In example 13, the plurality of digital-to-analog converter cells of the apparatus of example 11 or example 12 is further configured to generate a first radio frequency component using the first coordinate and the first local oscillator signal, and to generate a second radio frequency component using the second coordinate and the second local oscillator signal, and wherein the apparatus further comprises a signal combiner configured to combine the first radio frequency component and the second radio frequency component.

In example 14, the apparatus of any of examples 11 to 13 is only operated if a ratio of a desired power of the radio frequency signal and a maximum power of the radio frequency signal achievable by the plurality of digital-to-analog converter cells satisfies a quality criterion.

In example 15, the apparatus of any of the preceding examples is only operated if a desired bandwidth of the radio frequency signal is higher than a threshold value.

Example 16 is a transmitter comprising an apparatus for generating a radio frequency signal of any of examples 1 to 15.

In example 17, the symbol is related to a baseband signal in the transmitter of example 16.

Example 18 is a mobile communications device comprising a transmitter according to example 16 or example 17.

In example 19, the mobile communications device of example 18 further comprises at least one antenna coupled to the transmitter.

Example 20 is a means for generating a radio frequency signal based on a symbol within a constellation diagram spanned by a first axis representing an in-phase component and an orthogonal second axis representing a quadrature component, the method comprising: a means for selecting one of a plurality of segments of the constellation diagram containing the symbol, wherein the segment is delimited by two radially extending boundaries, the two radially extending boundaries spanning an opening angle of the segment being different from 90°, wherein the means for selecting is further configured to calculate a first coordinate of the symbol with respect to a third axis, and a second coordinate of the symbol with respect to a fourth axis, wherein at least one of the third axis and the fourth axis coincides with one of the two radially extending boundaries; and a means for generating the radio frequency signal using the first coordinate and the second coordinate.

In example 21, at least one of the third and fourth axes is different from the first and second axes, if the other of the third and fourth axes coincides with one of the first and second axes in the means of example 20.

Example 22 is a method for generating a radio frequency signal based on a symbol within a constellation diagram spanned by a first axis representing an in-phase component and an orthogonal second axis representing a quadrature component, the method comprising: selecting one of a plurality of segments of the constellation diagram containing the symbol, wherein the segment is delimited by two radially extending boundaries, the two radially extending boundaries spanning an opening angle of the segment being different from 90°; calculating a first coordinate of the symbol with respect to a third axis, and a second coordinate of the symbol with respect to a fourth axis, wherein at least one of the third axis and the fourth axis coincides with one of the two radially extending boundaries; and generating the radio frequency signal using the first coordinate and the second coordinate.

In example 23, at least one of the third and fourth axes is different from the first and second axes in the method of example 22, if the other of the third and fourth axes coincides with one of the first and second axes.

In example 24, the third axis and the fourth axis span an angle of 90° in the method of example 22 or example 23.

In example 25, one of a fifth axis and a sixth axis spanning an angle of 90° coincides with a third radially extending boundary of a second segment adjacent to the one segment in the method of example 24, wherein the symbol is positioned at the one of the two radially extending boundaries that delimits the first segment from the second segment, wherein one of the first and second coordinates is equal to a third coordinate of the symbol with respect to the fifth axis, and wherein the other of the first and second coordinates is equal to a fourth coordinate of the symbol with respect to the sixth axis.

In example 26, the third axis and the fourth axis coincide with the two radially extending boundaries of the segment in the method of example 22 or example 23.

In example 27, 360° is a multiple integer of the opening angle in the method of any of the preceding examples.

In example 28, $\Phi=\tan^{-1}(2^{-n})$ in the method of any of examples 22 to 26, with $\Phi$ denoting the opening angle, $\tan^1$ denoting the arctangent function, and n being an integer number.

In example 29, the opening angle is smaller than 90° in the method of any of the preceding examples.

In example 30, the opening angle is selected based on a desired characteristic of the radio frequency signal in the method of any of the preceding examples.

In example 31, the characteristic in the method of example 30 is the frequency of the radio frequency signal.

In example 32, generating the radio frequency signal in the method of any of the preceding examples is further based on a first local oscillator signal and a second local oscillator signal comprising a phase difference equal to an angle spanned by the third axis and the fourth axis.

In example 33, the method of example 32 further comprises: generating the first local oscillator signal using a reference local oscillator signal, the opening angle, and information on the one segment; and generating the second local oscillator signal using the reference local oscillator signal, the opening angle, the information on the one segment, and the angle spanned by the third axis and the fourth axis.

In example 34, generating the radio frequency signal in the method of example 32 or example 33 comprises: generating a first radio frequency component using the first coordinate and the first local oscillator signal; generating a second radio frequency component using the second coordinate and the second local oscillator signal; and combining the first radio frequency component and the second radio frequency component.

In example 35, generating the radio frequency signal in the method of any of examples 32 to 34 is performed by a plurality of digital-to-analog converter cells, wherein the method is only performed if a ratio of a desired power of the radio frequency signal and a maximum power of the radio frequency signal achievable by the plurality of digital-to-analog converter cells satisfies a quality criterion.

In example 36, the method of any of the preceding examples is only performed if a desired bandwidth of the radio frequency signal is higher than a threshold value.

Example 37 is a computer readable storage medium having stored thereon a program having a program code for performing the method of any of examples 22 to 36, when the program is executed on a computer or processor.

Example 38 is a computer program having a program code configured to perform the method of any of examples 22 to 36, when the computer program is executed on a computer or processor.

Further RF signal generation related aspects that may be applied to examples herein are described in co-pending International Patent Application No. PCT/IB2015/057379, filed under the Patent Cooperation Treaty (PCT) on Sep. 25, 2015, entitled "AN APPARATUS AND A METHOD FOR APPROXIMATING A FIRST SIGNAL USING A SECOND SIGNAL"; co-pending International Patent Application No. PCT/IB2015/057375, filed under the PCT on Sep. 25, 2015, entitled "AN APPARATUS AND A METHOD FOR GENERATING A RADIO FREQUENCY SIGNAL"; and co-pending International Patent Application No. PCT/IB2015/057376, filed under the PCT on Sep. 25, 2015, entitled "APPARATUSES AND METHODS FOR GENERATING A RADIO FREQUENCY SIGNAL, A MODULATOR, A CONTROLLER FOR A MODULATOR, AND A METHOD FOR CONTROLLING A MODULATOR".

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for generating a radio frequency signal based on a symbol within a constellation diagram spanned by a first axis representing an in-phase component and an orthogonal second axis representing a quadrature component, the apparatus comprising:
   a processing unit configured to select one of a plurality of segments of the constellation diagram containing the symbol, wherein the one segment is delimited by two radially extending boundaries, the two radially extending boundaries spanning an opening angle of the segment being different from 90°,
   wherein the processing unit is further configured to calculate a first coordinate of the symbol with respect to a third axis, and a second coordinate of the symbol with respect to a fourth axis, wherein at least one of the third axis and the fourth axis coincides with one of the two radially extending boundaries; and
   a plurality of digital-to-analog converter cells configured to generate the radio frequency signal using the first coordinate and the second coordinate.

2. The apparatus of claim 1, wherein at least one of the third and fourth axis is different from the first and second axis, when the other of the third and fourth axis coincides with one of the first and second axis.

3. The apparatus of claim 1, wherein the third axis and the fourth axis span an angle of 90°.

4. The apparatus of claim 3, wherein one of a fifth axis and a sixth axis spanning an angle of 90° coincides with a third radially extending boundary of a second segment adjacent to the one segment, wherein the symbol is positioned at the one of the two radially extending boundaries that delimits the first segment from the second segment, wherein one of the first and second coordinates is equal to a third coordinate of the symbol with respect to the fifth axis, and wherein the other of the first and second coordinates is equal to a fourth coordinate of the symbol with respect to the sixth axis.

5. The apparatus of claim 1, wherein the third axis and the fourth axis coincide with the two radially extending boundaries of the segment.

6. The apparatus of claim 1, wherein 360° is a multiple integer of the opening angle.

7. The apparatus of claim 1, wherein $$\Phi = \tan^{-1}(2^{-n}),$$

with $\Phi$ denoting the opening angle, $\tan^{-1}$ denoting the arctangent function, and n being an integer number.

8. The apparatus of claim 1, wherein the opening angle is smaller than 90°.

9. The apparatus of claim 1, wherein the processing unit is configured to select the opening angle based on a desired characteristic of the radio frequency signal.

10. The apparatus of claim 9, wherein the characteristic is the frequency of the radio frequency signal.

11. The apparatus of claim 1, wherein the plurality of digital-to-analog converter cells is further configured to generate the radio frequency signal based on a first local oscillator signal and a second local oscillator signal comprising a phase difference equal to an angle spanned by the third axis and the fourth axis.

12. The apparatus of claim 11, further comprising a multi-phase generator, wherein the multi-phase generator is configured to:
   generate the first local oscillator signal using a reference local oscillator signal, the opening angle, and information on the one segment; and
   generate the second local oscillator signal using the reference local oscillator signal, the opening angle, the information on the one segment, and the angle spanned by the third axis and the fourth axis.

13. The apparatus of claim 11, wherein the plurality of digital-to-analog converter cells is further configured to generate a first radio frequency component using the first coordinate and the first local oscillator signal, and to generate a second radio frequency component using the second coordinate and the second local oscillator signal, and wherein the apparatus further comprises a signal combiner configured to combine the first radio frequency component and the second radio frequency component.

14. The apparatus of claim 11, wherein the apparatus is only operated when a ratio of a desired power of the radio frequency signal and a maximum power of the radio frequency signal achievable by the plurality of digital-to-analog converter cells satisfies a quality criterion.

15. A transmitter comprising an apparatus for generating the radio frequency signal according to claim 1.

16. A method for generating a radio frequency signal based on a symbol within a constellation diagram spanned by a first axis representing an in-phase component and an orthogonal second axis representing a quadrature component, the method comprising:

selecting one of a plurality of segments of the constellation diagram containing the symbol, wherein the segment is delimited by two radially extending boundaries, the two radially extending boundaries spanning an opening angle of the segment being different from 90°;

calculating a first coordinate of the symbol with respect to a third axis, and a second coordinate of the symbol with respect to a fourth axis, wherein at least one of the third axis and the fourth axis coincides with one of the two radially extending boundaries; and generating the radio frequency signal using the first coordinate and the second coordinate.

17. The method of claim 16, wherein at least one of the third and fourth axis is different from the first and second axis when the other of the third and fourth axis coincides with one of the first and second axis.

18. The method of claim 16, wherein the third axis and the fourth axis span an angle of 90°.

19. The method of claim 18, wherein one of a fifth axis and a sixth axis spanning an angle of 90° coincides with a third radially extending boundary of a second segment adjacent to the one segment, wherein the symbol is positioned at the one of the two radially extending boundaries that delimits the first segment from the second segment, wherein one of the first and second coordinates is equal to a third coordinate of the symbol with respect to the fifth axis, and wherein the other of the first and second coordinates is equal to a fourth coordinate of the symbol with respect to the sixth axis.

20. The method of claim 16, wherein the third axis and the fourth axis coincide with the two radially extending boundaries of the segment.

21. The method of claim 16, wherein 360° is a multiple integer of the opening angle.

22. The method of claim 16, wherein $$\Phi=\tan^{-1}(2^{-n}),$$

with $\Phi$ denoting the opening angle, $\tan^{-1}$ denoting the arctangent function, and n being an integer number.

23. The method of claim 16, wherein the opening angle is smaller than 90°.

24. The method of claim 16, wherein the opening angle is selected based on a desired characteristic of the radio frequency signal.

25. The method of claim 16, wherein generating the radio frequency signal is further based on a first local oscillator signal and a second local oscillator signal comprising a phase difference equal to an angle spanned by the third axis and the fourth axis.

* * * * *